United States Patent

Winner et al.

[11] Patent Number: 5,999,874
[45] Date of Patent: Dec. 7, 1999

[54] METHOD AND APPARATUS FOR CONTROLLING THE VELOCITY OF A VEHICLE

[75] Inventors: Hermann Winner, Karlsruhe; Stefan Witte, Minden; Bernd Lichtenberg, Bietigheim-Biassingen; Werner Uhler, Bruchsal, all of Germany

[73] Assignee: Robert Bosch GmbH, Stuttgart, Germany

[21] Appl. No.: 08/929,430

[22] Filed: Sep. 15, 1997

[30] Foreign Application Priority Data

Sep. 13, 1996 [DE] Germany .......................... 196 37 245

[51] Int. Cl.⁶ .......................... B60K 31/04; G06F 165/00
[52] U.S. Cl. .............................. 701/93; 701/96; 701/301; 342/455; 340/903
[58] Field of Search ................................ 701/93, 96, 300, 701/301; 340/903, 435, 436; 180/170, 169; 342/455, 458

[56] References Cited

U.S. PATENT DOCUMENTS

| | | | |
|---|---|---|---|
| 5,400,864 | 3/1995 | Winner et al. .......................... | 180/169 |
| 5,483,453 | 1/1996 | Uemura et al. .......................... | 701/23 |
| 5,517,412 | 5/1996 | Unoura .......................... | 701/23 |
| 5,521,579 | 5/1996 | Bernhard .......................... | 340/438 |
| 5,629,851 | 5/1997 | Williams et al. .......................... | 701/96 |
| 5,670,963 | 9/1997 | Kubota et al. .......................... | 342/70 |
| 5,761,629 | 6/1998 | Gilling .......................... | 701/96 |

FOREIGN PATENT DOCUMENTS 0716949 of 1995 European Pat. Off. .
4200694 of 1993 Germany .

OTHER PUBLICATIONS

Winner et al. "Adaptive Cruise Control System Aspects and Development Trends" SAE International Congress and Exposition, Detroit, Michigan, Feb. 26 to 29, 1996.

Primary Examiner—Tan Nguyen
Attorney, Agent, or Firm—Fulbright & Jaworski, LLP

[57] ABSTRACT

A method and an apparatus based thereon for automatically controlling the velocity of a vehicle (14) under consideration of preceding vehicles (15, 16, 17) are described. To select a preceding vehicle as the control target, an area of the possible future travel (18) is determined. When the controlled vehicle is about to and/or is beginning to change lanes, the determined area of future travel is expanded (19).

17 Claims, 2 Drawing Sheets

METHOD AND APPARATUS FOR CONTROLLING THE VELOCITY OF A VEHICLE

FIELD OF THE INVENTION

The present invention pertains to a method for controlling the velocity of a vehicle under consideration of preceding vehicles and to an apparatus for implementing the method.

DESCRIPTION OF THE PRIOR ART

Corresponding methods and apparatuses are known under the name "adaptive cruise controllers" (ACC). These are described in, for example, the article by Winner, Witte, et al.: "Adaptive Cruise Control—System Aspects and Development Trends", published as Paper No. 961010 of the SAE 96 in Detroit on Feb. 26–29, 1996. In summary, such methods and apparatuses comprise a conventional driving velocity control system, on which an automatic distance control is superimposed in cases where an additional sensor is provided to detect preceding vehicles. In view of today's traffic conditions, this necessarily leads to the problem of how to select one particular vehicle from among several preceding vehicles as the target of the automatic distance control process.

EP 0 716 949 A1 describes a method of the general type in question and an apparatus based thereon, in which automatic velocity control is realized under consideration of several preceding vehicles and in which a change of lane by the preceding vehicles is also taken into account. To accomplish this task, means are used which supply data on the angular position of the individual preceding vehicles. In addition, means are used which assign a preceding vehicle to a predetermined angular range. One of three possible automatic control strategies is then selected as a function of which of various traffic situations is present. Simultaneously, one of the preceding vehicles is selected as the target of the automatic distance control. Nevertheless, this publication does not discuss the problem of how a preceding vehicle is selected as a control target when the automatically controlled vehicle changes from one lane to another.

DE 42 00 694 A1 describes a method of the general type in question which does take into consideration a change of lane by the controlled vehicle, especially in conjunction with passing. According to this method, the distance control is completely interrupted for a certain period of time when certain indices are present. At the end of a time span which is preset in the system, the distance control then automatically resumes operation with the previously set parameters. Speaking precisely, therefore, it is not the control system which guides the vehicle during a change of lane but rather the driver.

SUMMARY OF THE INVENTION

The goal of the present invention is therefore to propose a method and an apparatus based thereon for automatically controlling the velocity of a vehicle under consideration of preceding vehicles, even if, and while, the controlled vehicle is changing from one lane to another.

The task is accomplished in accordance with the invention in that, in the presence of indicators of a beginning or intended change of lane, the forward area taken into account for distance control is expanded. For this purpose, means are provided for detecting preceding vehicles and for determining at least their distance, their velocity, and their angle with respect to the controlled vehicle. On the basis of dynamic data of the vehicle, such as, for example, its yaw rate, steering angle, transverse acceleration, and/or the rotational speeds of its wheels, additional means determine an area within which the further travel of the controlled vehicle will fall. In the ideal case, this area coincides with the further course of the lane in which the controlled vehicle is traveling. Under normal driving conditions in this lane, the distance control takes into account only the vehicles which are in this specific area of further courses predicted for the controlled vehicle. When indicators which signify a change of lane are present, this predicted range of courses is expanded by an amount equivalent to as much as the width of one lane.

If, as a result, several preceding vehicles can be considered potential targets of the automatic distance control process, the vehicle which is selected is the one which requires the least nominal acceleration of the controlled vehicle. Any slowdown necessary is considered a negative acceleration.

The assumed area of future travel is restored from the expanded state to its normal state when it is recognized that the lane change has been completed and/or after the indicators of an intended and/or beginning change of lane have been present for certain period of time. This certain period of time is preferably in the range between 2 and 5 seconds.

The intention to change lanes or the beginning of the lane change process can be recognized on the basis of variables which characterize the driving dynamics such as, again, the yaw rate, the steering angle, and/or the transverse acceleration; on the basis of the directional indicator or turn signal; and/or on the basis of video image processing.

The advantage of the method according to the invention is that the vehicles in the adjacent lane are factored into the control algorithm at a very early point. As a result, when a new control target is accepted, the transition takes place sooner. The behavior of the controlled vehicle is thus more comfortable overall and can be reconstructed more clearly. In addition, the early consideration of a vehicle in the adjacent lane increases driving safety, because any deceleration which may be necessary can be initiated by actuation of the brakes, for example, even before the lane change is completed.

DETAILED DESCRIPTION

Figure 1A:
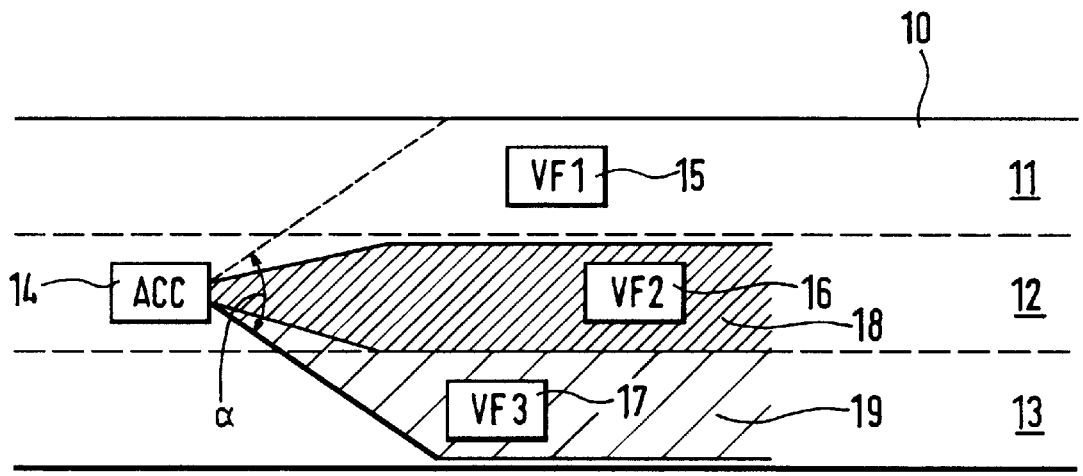
FIGS. 1a and 1b show two possible scenarios in which a change of lane can occur.

FIG. 1a shows a sketch of a straight, three-lane road, the left, center, and right lanes of which are designated 11, 12, and 13, respectively. In the center lane is a vehicle 14 with an automatic control apparatus according to the invention. In front of controlled vehicle 14 are three preceding vehicles 15, 16, 17, one in each lane. Two lines diverge from the front of controlled vehicle 14 to form a V with an angle α; these lines characterize the field of view of an angle-resolving distance and velocity sensor. This can be, for example, a multi-beam and/or moving radar or laser sensor. A dark-shaded surface 18 characterizes the area assumed to cover the future course of travel of the controlled vehicle. This area opens here by way of example in the shape of a V from the front of controlled vehicle 14 and extends out as far as the width of the actual lane itself; in the ideal case, it coincides with lane 12 in the direction of travel of controlled vehicle 14. Preceding vehicle 16, which is traveling in lane 12, is also covered by dark-shaded area 18. A lightly shaded area 19 characterizes an expansion of the area of the assumed travel of the vehicle 14 It expands future travel area 18 by the width of one lane and covers right lane 13 in the travel direction of controlled vehicle 14 and another preceding vehicle 17, also traveling in this lane 13.

Figure 1B:
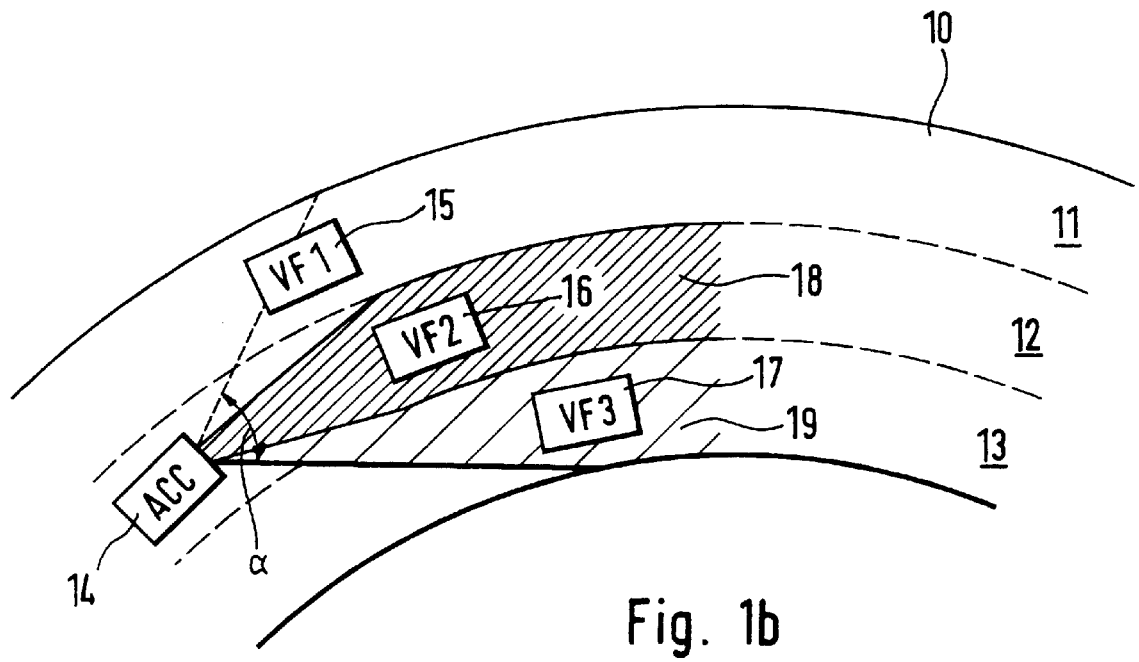

FIG. 1b shows the same scenario as that in FIG. 1a, except that here road 10 describes a curve. The vehicles sketched in the drawing, the shaded areas, and the numbering are the same as in FIG. 1a. The figure is intended to illustrate that the method described below operates independently of whether the road curves or not.

Figure 2:
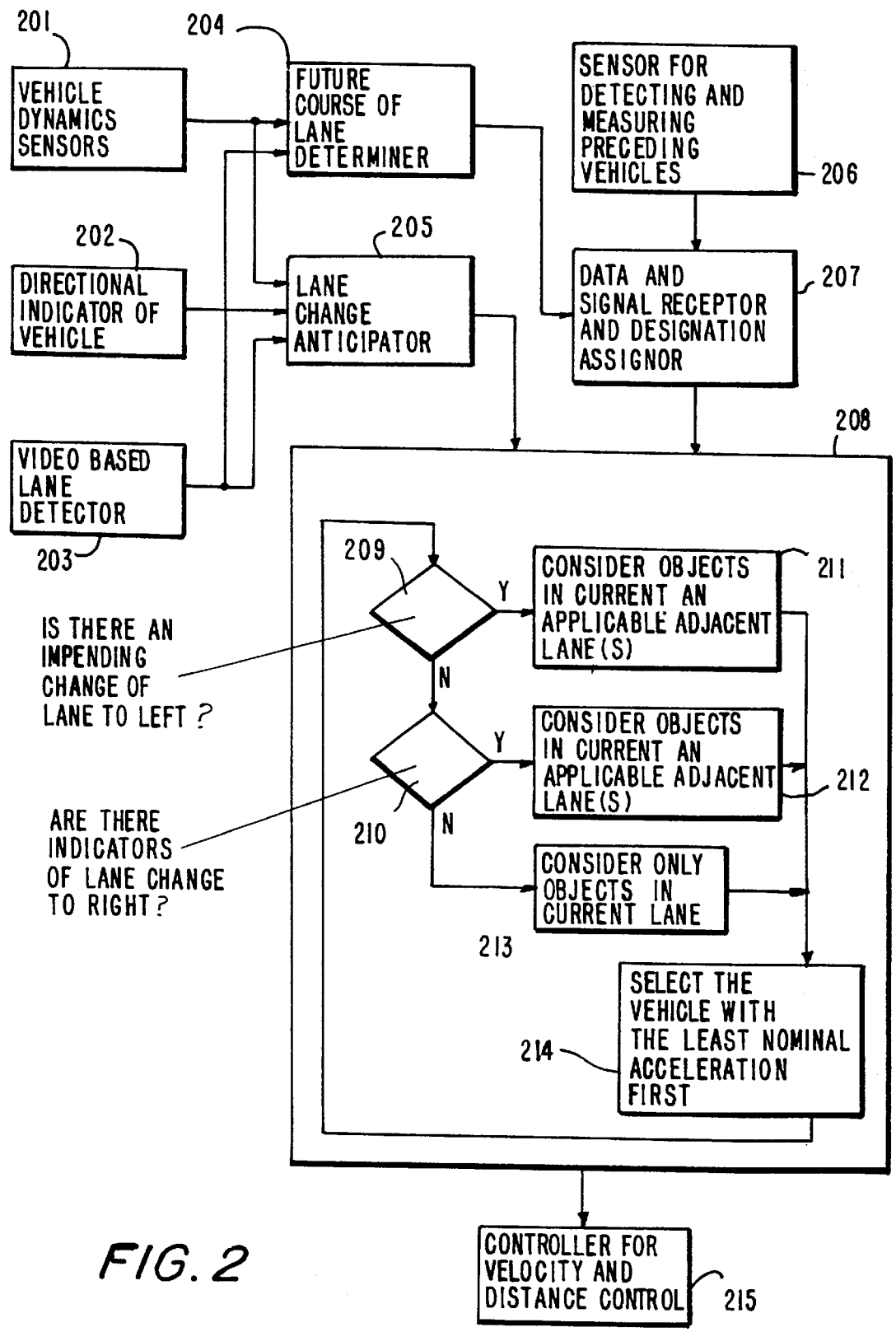
FIG. 2 shows a block circuit diagram and a flow chart of an apparatus according to the invention.

FIG. 2 shows a block circuit diagram of an apparatus according to the invention. A block 201 symbolizes the sensors of vehicle dynamics. These include, for example, sensors which detect, individually or in combination, the yaw rate of the vehicle, its steering angle, transverse accelerations, and/or the rotational speeds of the wheels. Block 202 symbolizes the directional indicator of the vehicle. Block 203 symbolizes a video-based lane detector. The signals of at least one of blocks 201 and 203 are sent to a block 204, which determines the future travel area from the signals supplied to it. Simultaneously, the signals of at least one of blocks 201–203 are sent to a block 205, which is designated the lane-change anticipator. Here, indicators which signify that a change of lane is about to occur are determined from the signals supplied to the block. When a video-based lane detector 203 is present, this conclusion can be derived, for example, from the fact that the lateral distance to the closest detected lane dividing line is continuously decreasing.

Alternatively or additionally, only a crossing of the lane dividing line or a minimum distance from it is accepted as a valid indicator. The values of driving dynamics can be compared, for example, with stored patterns, which can be derived from recorded data and which contain features or combinations of features which are in turn typical of lane changes. A highly reliable indicator of an impending lane change is, of course, the activation of the directional indicator.

A block 206 symbolizes a sensor for detecting preceding vehicles and for measuring the distance to them, their velocity, and their angular position. This is preferably a radar sensor, which, for example, resolves angles by the use of several incoming beams and/or by swinging one incoming beam back and forth electrically or mechanically. Here, of course, any suitable alternative solutions are also conceivable, such as laser systems. The radar sensor sends its signals to a block 207, which simultaneously receives data or signals from block 204.

Inside block 207, the radar objects detected by block 206 are assigned to one of three classes of objects, namely, "objects in the assumed area of future travel", "objects in a lane to the left thereof", and "objects in a lane to the right thereof". The data of block 207 and of block 205 are sent to a block 208, which serves to realize the method according to the invention. In it, a flow chart illustrates the implementation of the method.

Within block 208, the first step 209 is to decide whether or not a change of lane to the left is impending. The basis for this decision is supplied by previously mentioned block 205. If there are no signs that a change of lane to the left is occurring, step 210 asks whether there are any indicators of a lane change to the right. If the answer is also "no" in this case, then in step 213 only the objects in the current assumed travel area are considered. If either of the two preceding tests results in a "yes" answer, that is, if there are indicators of a lane change, then in steps 211 and 212 the objects in the current assumed travel area and the applicable adjacent lane are taken into consideration. Of course, the sequence of question steps 209 and 210 can also be reversed.

If, as shown in the two scenarios of FIG. 1, more than one vehicle is available for selection, in step 214 the program selects as its concrete control target the vehicle which requires the least nominal acceleration $a_{nom}$ of the controlled vehicle. If it is necessary for the controlled vehicle to slow down, this is considered and evaluated as a negative acceleration. For the selection of a preceding vehicle as the control target, therefore, a nominal acceleration $a_{nom}$ of the controlled vehicle relative to each preceding vehicle being considered is determined first. Then, the preceding vehicle which results in the least nominal acceleration $a_{nom}$ is selected as the control target.

The data on the vehicle thus selected are sent from block 208 to a controller 215, which brings about the velocity and distance control.

In the actual driving situation, block 204 now determines continuously the area of future travel on the basis of the driving dynamics values being supplied to it. This area, designated travel area 18, is in the ideal case identical to the path of the lane in the travel direction of vehicle 14. Slight and/or short-term deviations, however, can be caused by superimposed interference, ambiguities, and/or measurement errors. Of all the detected preceding vehicles, only those which are within this future travel area 18 are considered for distance control. Vehicles outside future travel area 18, however, are also detected because of the increase in the spread of beam angle $\alpha$. In the scenario according to FIGS. 1a or 1b, this means that, under normal driving conditions, that is, when there are no signs of a lane change, only preceding vehicle 16 is taken into consideration for distance control.

If block 205 now realizes, on the basis of the data sent to it, that a change of lane is intended or actually begun, the future travel area being considered is expanded by the width of one lane in the direction of the recognized lane change. In concrete terms, this means that the future travel area determined in block 204 is increased in size by, for example, 3.5 m in the direction of the impending lane change. The extent of the expansion either is based on an averaged and stored empirical value or can be derived, for example, from video processor 203. Alternatively or in addition, the expansion can also be adapted dynamically as a function of the current course of travel or vehicle velocity or in dependence on a predetermined time function.

On the basis of such an expansion, all vehicles traveling in the two shaded areas 18, 19 according to FIGS. 1a and 1b are taken into consideration for distance control.

If now, as shown in the two scenarios, more than one vehicle is available for selection, in step 214 the vehicle which is selected as the concrete control target is the one which requires the minimum nominal acceleration of the controlled vehicle. Any slowdown which may be required is considered and evaluated as a negative acceleration.

This selection on the basis of minimum nominal acceleration has the effect that a change from one control target to another occurs as smoothly and thus as comfortably as possible. In addition, the greatest possible degree of safety is obtained, because the selected control target is, on account of the principle involved, always the most critical target as well. It should be noted in this context that, in this selection, the distance to the preceding vehicle in question can be a criterion but does not have to be the only criterion. For example, the nominal acceleration of the controlled vehicle can be calculated according to the invention by means of the following formula:

$$a_{nom} = c_1 \cdot v_{rel} + c_2 \cdot (d - d_{nom})$$

where $a_{nom}$ = the nominal acceleration of the controlled vehicle;
$c_1$, $c_2$ = weighting factors;
$v_{rel}$ = the relative velocity between the controlled vehicle and the preceding vehicle;
$d$ = the distance between the controlled vehicle and the preceding vehicle; and
$d_{nom}$ = the value set for the nominal or minimum distance between the controlled and preceding vehicle.

Because, in addition to distance d, the relative velocity $v_{rel}$, is also included in this formula, under certain conditions a vehicle which is farther ahead but which is traveling very slowly will be selected in preference to a vehicle which is closer but traveling at greater speed. A human driver would evaluate this type of situation in the same way.

Once the initiated lane change has been completed, the considered future travel area 18, 19 is returned to its original width 18. This is done when, upon repetition of question steps 209, 210, there are no longer any indicators of a lane change present.

The expansion of the considered future travel area is also reversed when the indicators for a lane change are present for longer than a predetermined time of, for example, 10 seconds. According to subjective empirical values, it is typical for a period of 2–5 seconds to pass between the actuation of the turn signal and the point at which the vehicle has changed its position by half a lane, that is, the point at which the vehicle is on the dividing line between two lanes. Accordingly, after an appropriately chosen, predetermined time has expired, it is no longer assumed that a change of lane is in progress.

Alternatively or in addition, the expansion of the considered future lane can also be reversed dynamically, in that the offset from the previous course is determined on the basis of the values of driving dynamics, and the expansion is reduced in the case in question by an amount equivalent to this measured offset.

What is claimed is:

1. A method for automatically controlling a velocity of a vehicle based on consideration of preceding vehicles, said method comprising:
   selecting one of said preceding vehicles from an area of possible future travel and of the vehicle to be controlled to serve as a control target for determining the velocity of the vehicle to be controlled;
   determining said area of possible future travel courses of lanes for the controlled vehicle and at least one land adjacent thereto, each of the preceding vehicles being assigned to one of said area of possible future travel or said lane or lanes
   adjusting the velocity of the controlled vehicle, responsive to an indication that the controlled vehicle is going to move from a lane in which it is traveling to another of said lanes, based on a preceding vehicle traveling in the lane to which the controlled vehicle is going to move, such that when the indication of lane change in a direction is detected, the area assigned to the vehicle or vehicles considered for said selection is expanded in the direction of the lane change wherein the selection of a preceding vehicle as the control target is accomplished, first, based on whether the preceding vehicle is in the considered area of possible future travel and, second, based on which of the preceding vehicles still available for selection requires the least nominal acceleration of the controlled vehicle and further wherein, said expansion of the considered area is reversed when it is recognized that the lane change has been completed or after the indication of lane change has been present for a period which exceeds a selectable, predetermined time limit.

2. Method according to claim 1, wherein, when the indication of lane change in a direction is detected, the area assigned to the vehicle or vehicles considered for said selection is expanded in the direction of the lane change.

3. Method according to claim 1, wherein the selection of a preceding vehicle as the control target is accomplished, first, based on whether the preceding vehicle is in the considered area of possible future travel and, second, based on which of the preceding vehicles still available for selection requires the least nominal acceleration of the controlled vehicle.

4. Method according to claim 1, wherein the considered area is expanded by the width of one lane when said indication of a change of lane is detected.

5. Method according to claim 1, wherein the indication of a lane change is recognized on the basis of values characterizing the driving dynamics, on the basis of the directional indicator, and/or on the basis of video image processing.

6. Method according to claim 2, wherein said expansion of the considered area is reversed when it is recognized that the lane change has been completed and/or after the indication of lane change has been present for a period which exceeds a selectable, predetermined time limit.

7. Method according to claim 1, wherein the selection of a preceding vehicle as the control target includes consideration of the distance and relative velocity of the respective preceding vehicle with respect to the controlled vehicle.

8. Method according to claim 1, wherein the indication of lane change is the activation of a turn signal.

9. An apparatus for controlling the speed of a vehicle travelling in one of a plurality of lanes, said apparatus comprising:
   means for recognizing an indication that the vehicle to be controlled is about to change lanes or is beginning to change lanes;
   means for determining an area of assumed future travel for the vehicle to be controlled and at least one lane adjacent thereto;
   means for selecting one of said preceding vehicles within the area of assumed future travel as the control target as the control target;
   means for expanding the considered area responsive to recognition by said means for recognizing that the controlled vehicle intends to change or is beginning to change lanes
   wherein said expansion of the considered area is reversed when it is recognized that the lane change has been completed or after the indication of lane change has been present for a period which exceeds a selectable, predetermined time limit; and
   means for controlling the speed of the vehicle to be controlled thereon.

10. Apparatus according to claim 9, wherein, responsive to the recognition of lane change in a direction, the means for expanding expands the area considered for said selection in the direction of the lane change.

11. Apparatus according to claim 9, wherein the means for selecting selects a preceding vehicle as the control target, first, based on whether the preceding vehicles is in the considered area and, second, based on which of the preceding vehicles still available for selection requires the least nominal acceleration of the controlled vehicle.

12. Apparatus according to claim 9, wherein the means for expanding expands the considered area by the width of one lane when said indication of a change of lane is detected.

13. Apparatus according to claim 9, wherein the indication of a lane change is recognized on the basis of values characterizing the driving dynamics, on the basis of the directional indicator, and/or on the basis of video image processing.

14. Apparatus according to claim 9, wherein said expansion of the considered lane is reversed when it is recognized that the lane change has been completed.

15. Apparatus according to claim 9, wherein said expansion of the considered lane is reversed after the indication of lane change has been present for a period which exceeds a selectable, predetermined time limit.

16. Apparatus according to claim 9, wherein the selection of a preceding vehicle as the control target includes consideration of the distance and relative velocity of the respective preceding vehicle with respect to the controlled vehicle.

17. Apparatus according to claim 9, wherein the indication of lane change is the activation of a turn signal.

* * * * *